July 26, 1955     E. M. GODWIN, SR     2,713,689
VAGABOND TRAVELER

Filed Dec. 4, 1950     2 Sheets-Sheet 1

Edgar M. Godwin Sr.
INVENTOR.

BY
Attorneys

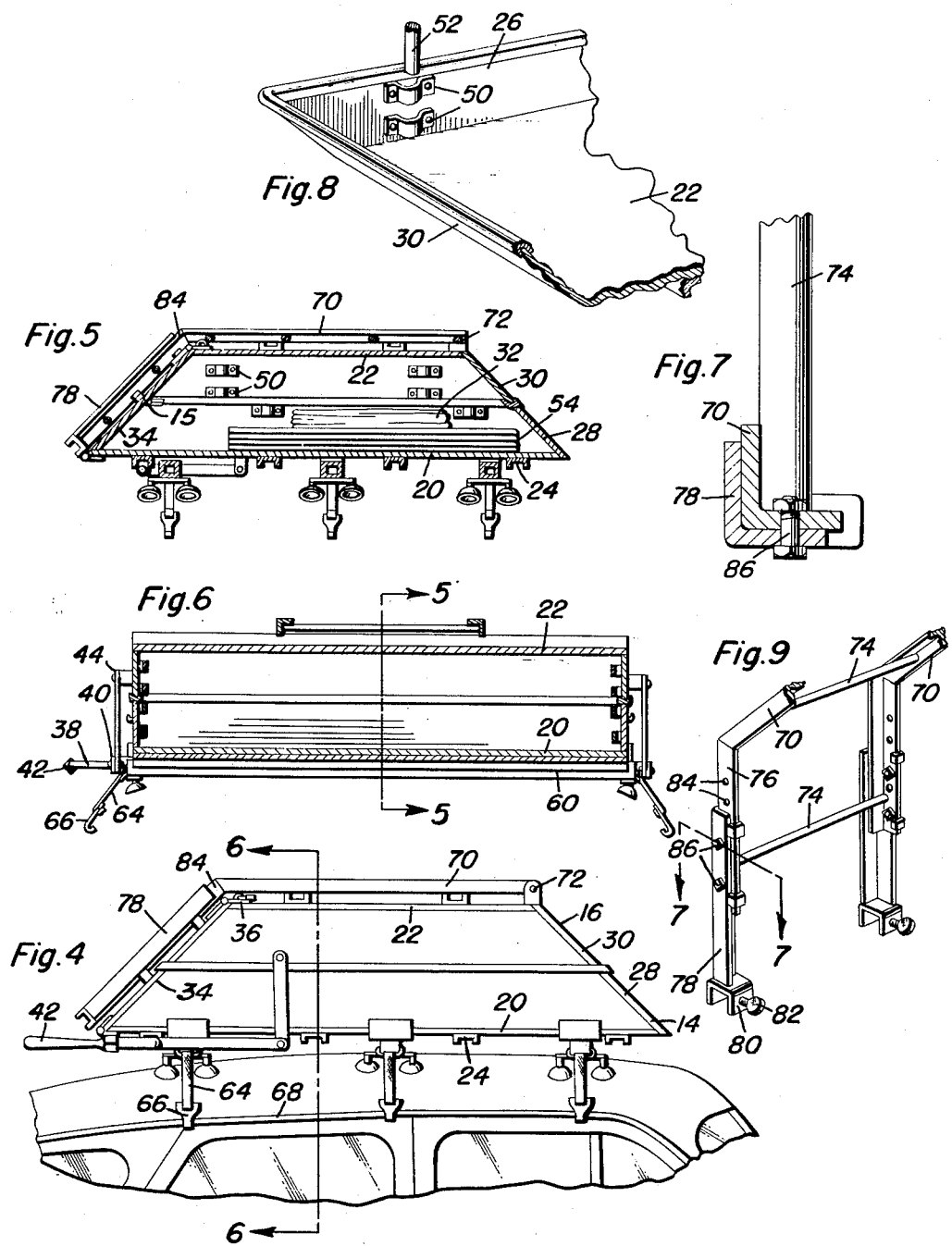

United States Patent Office 2,713,689
Patented July 26, 1955

2,713,689

VAGABOND TRAVELER

Edgar M. Godwin, Sr., Fallon, Nev.

Application December 4, 1950, Serial No. 198,962

5 Claims. (Cl. 5—119)

This invention comprises novel and useful improvements in a vagabond traveller and more specifically pertains to a collapsible automobile sleeping assembly mounted and supported upon the roof of an automobile in an improved manner to provide sleeping quarters thereon.

The primary object of this invention is to provide a collapsible automobile sleeping assembly specifically adapted and constructed for secure and convenient mounting and attachment to the roof of an automobile and which may be unfolded for use or may be folded to house all of the components of the attachment.

A still further object of the invention is to provide a collapsible automobile sleeping assembly in conformity with the foregoing objects which shall have an improved hinged construction together with a novel operating means whereby the device may be readily opened to its position ready for use or folded for compact storage of its components.

Yet another object of the invention is to provide a device in conformity with the preceding objects in which the supporting platform shall be so hinged as to constitute a satisfactory floor or platform for sleeping quarters when in its open position, or may be compactly folded to securely retain, conceal, house and protect the various elements forming the attachment when not in use.

Yet another important object of the invention is to provide a device as set forth in the foregoing objects in which is provided a combined access ladder and brace means, to both provide ready access to the assembly for utilizing its accommodations and for supporting and bracing the assembly in its opened position.

A still further object of the invention is to provide a device in conformity with the preceding object in which the ladder shall be so constructed and attached to the device so that the ladder may be compactly folded upon and conform to the contour of the device in the folded position of the latter.

These, together with various ancillary features and objects of the invention which will later become apparent as the following description proceeds, are attained by the present invention, a preferred embodiment of which has been illustrated, by way of example only, in the accompanying drawings, wherein:

Figure 4 is a fragmentary side elevational view showing the manner in which the device is positioned upon the roof of an automobile, but in its folded position;

Figure 5 is a vertical longitudinal central sectional view through the device in its folded position, the same being taken substantially upon the plane indicated by the section line 5—5 of Figure 6;

Figure 6 is a vertical transverse sectional view taken substantially upon the plane indicated by the section line 6—6 of Figure 4;

Figure 7 is a horizontal sectional view, taken substantially upon the plane indicated by the section line 7—7 of Figure 9 and showing certain details of the slidably adjustable and longitudinally extensible ladder forming a part of the invention;

Figure 8 is a fragmentary perspective view of a portion of the assembly in its open position, indicating the manner in which the top supporting bows are removably secured to the platform; and Figure 9 is a fragmentary perspective view of the lower portion of the ladder forming a part of the invention.

Referring now more specifically to the accompanying drawings, wherein like numerals designate similar parts throughout the various views, it will be seen that the novel collapsible sleeping assembly forming the subject of this invention and which is indicated generally by the numeral 10 is adapted to be mounted in a secure but detachable manner upon the roof of an automobile, indicated at 12, for permanent or semi-permanent installation thereon.

The fundamental intent of this invention is to provide a relatively compact, sturdy and light-weight assembly which is ideally adapted to be secured and mounted upon the top of an automobile vehicle for indeterminate periods of time to provide an elevated, safe and comfortable sleeping compartment for the occupants of the vehicle as during long trips, and the like.

Figure 1:
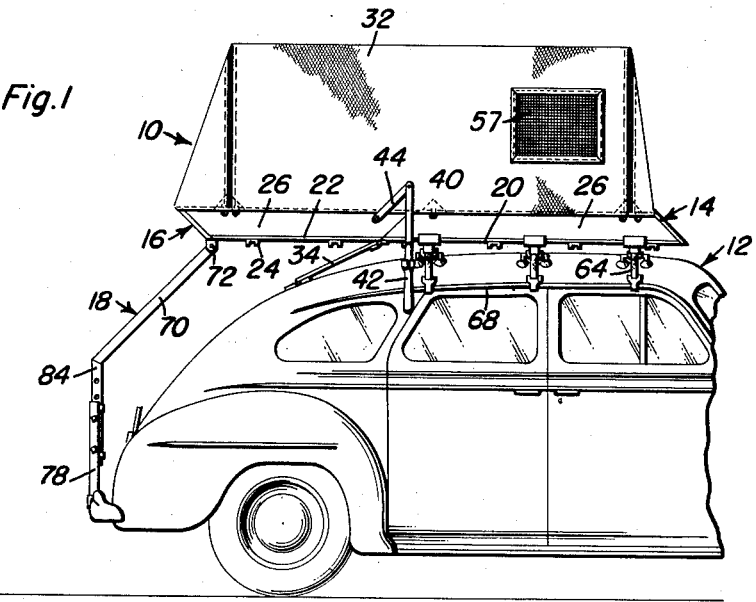
Figure 1 is a side elevational view showing a portion of the rear of an automotive vehicle of any conventional design and illustrating the manner in which the novel sleeping attachment of the present invention is mounted upon the roof of the automobile and is supported in its open position ready for use as a sleeping compartment.

The device forming the subject of this invention includes a folding platform or supporting base having a front section 14, to the rear end of which is hingedly connected, at 15, a rear section 16. As illustrated in the drawings, the front section 14 is mounted upon and secured to the top of the automobile 12, in any convenient position thereon, while the rear section 16 may be selectively folded upon the front section in the manner shown in Figures 4 and 5, or may be opened backwardly into alignment with the front section to form a rearward continuation of the same which overlies the rear portion of the automobile, as shown in Figure 1. In the open position, a ladder, indicated generally by the numeral 18, is employed both to provide means for obtaining access to the platform when the latter is to be employed as sleeping accommodations and for other purposes, and to rigidly support and secure the rear section of the platform to the vehicle.

Figure 2:
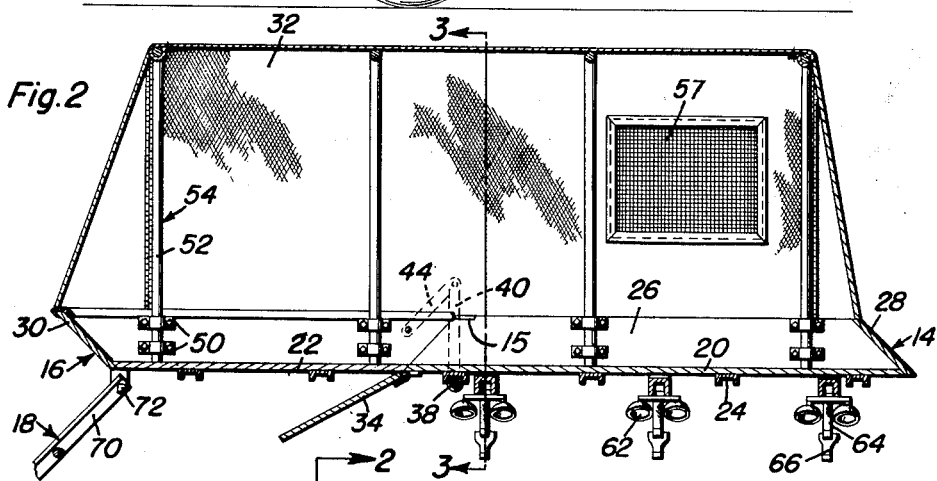
Figure 2 is a vertical central longitudinal sectional view through the device of Figure 1 and showing certain details of the internal construction of the same, the same being taken substantially upon the plane indicated by the section line 2—2 of Figure 3.
Figure 3:
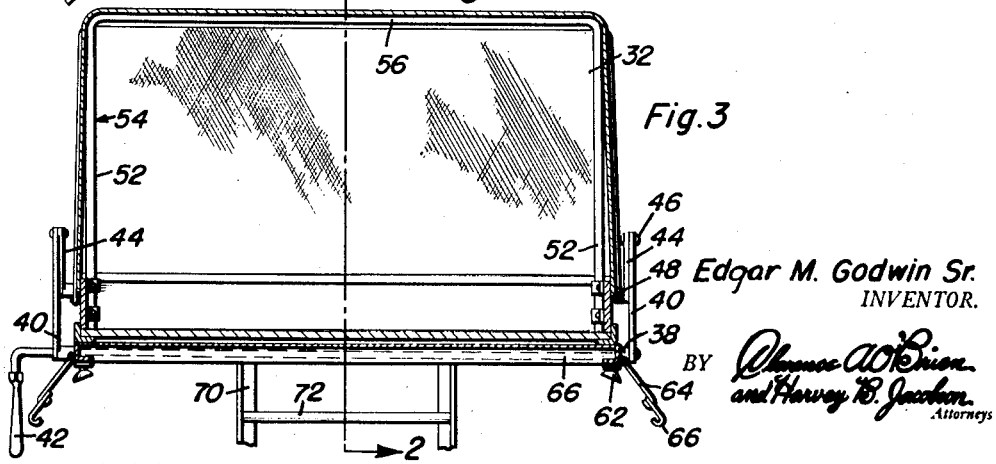
Figure 3 is a vertical transverse sectional view, taken substantially upon the plane indicated by the section line 3—3 of Figure 2.

From a closer inspection of the drawings, it will be seen that the front and rear sections 14 and 16 are each provided with a floor 20 and 22 which may be provided with suitable channel iron, transversely extending cleats or bracing members 24, each of the sections having a pair of side walls 26 and an end wall for each section at 28 and 30 disposed at the opposite ends of the sections. The adjacent ends of the sections are open, that is, are provided with no end walls, and are hinged to each other, at 15, in any suitable manner but in such a way that the rear section may be either positioned in horizontal alignment with the front section as shown in Figures 1 and 2, or may be completely folded upon the top of the same as shown in Figure 4, with the end walls 28 and 30 in alignment, at the front of the vehicle, while the open end walls are disposed at the rear of the vehicle.

As will now be apparent, in their folded positions, the front and rear sections of the platform constitute a housing which is utilized to store the flexible or pliable covering 32 of canvas or any other suitable water-proof material, the supporting means for the cover and any other accessories associated with the collapsible sleeping device.

The open ends of the sections disposed at the rear of the folded device are closed by a pivoted closure 34, which is appropriately hinged to the bottom wall 20 of the front section at the rear or open end of the same. This closure is adapted to overlie and close the two aligned open ends of the folded sections and may be clamped in position as by a hasp or the like, as at 36.

In order to render the opening and closing of the foldable sections easier, there is provided a crank shaft 38 which is suitably journaled upon the under side of the bottom wall 20 of the front section adjacent the open or rear end of the same, and which, on opposite sides of the device, is provided with a pair of crank arms 40, there being provided a manual hand lever 42 on one end of the crank shaft for causing a rocking action of the same. A pair of connecting links 44 are terminally pivoted to the ends of the crank arms 40 as by rivets, or the like, 46, and at their other ends are terminally pivoted to the side walls 26 of the rear section, as at 48. It will thus be apparent that by rocking the crank shaft through the operation of the hand lever 42, the rear section may be folded about its hinged connection 15 with the front section into either the open or closed position of the platform.

The side walls 26 of the two sections are provided upon their interior surfaces with suitable supporting brackets or sockets 50 which are adapted to removably receive the free or lower ends of the leg members 52 of U-shaped bows, indicated generally by the numeral 54, which bows have a horizontally disposed web portion 56. When the bows are disposed in the sockets, it is to be understood that the covering 32 may be drawn thereover to provide a tent-like shelter whose lower ends may be attached and secured to the platform in any desired manner. A ventilating screened opening may be provided, as at 57, and any other of the customary accessories of a tent-like shelter may be utilized if desired.

As shown in Figure 5, it is contemplated that the plurality of roof supporting bows 54, together with the folded covering 32, may be stored in the front section, or in the lower portion of the folded platform.

Any suitable means may be provided for detachably but firmly securing the front section to the roof of the automobile. A convenient mounting means is illustrated in the drawings as including transversely disposed supporting members 60 which underlie and support the bottom wall 20 of the front section and are secured to the front section in any desired manner. At their ends, these transverse members 60 are provided with suitable suction cups 62 adapted to engage the roof of the automobile for fixedly supporting the device thereon, and bracing straps 64 having hooks 66 may be further employed, these hooks being adapted to be disposed beneath the customary rain gutters 68 of the automobile.

It is intended that the front section shall be so securely attached to the automobile that the device will be safely and firmly secured thereto when in its collapsed or folded position, and also when in its open position. However, both to provide access means to the device in its open position and to brace or reinforce the overhanging rear section of the same, there is provided the above-mentioned ladder assembly 18.

This ladder has its upper portion provided with side rails 70 of angle iron construction and of any suitable material, which are pivoted at their upper ends, as at 72, to lugs fastened on the under surface of the extreme rearward end of the rear section, in its open position this ladder having the customary rungs or steps 74. The outer portion of the ladder is provided with a longitudinally extensible clamping means for securing the ladder to the rear bumpers of the automobile. For this purpose, the outer ends or lower ends of the ladder side members 70 are provided with angulated terminal portions 76, which, as shown more clearly in Figures 7 and 9, are slidably received in angle iron extension members 78 having U-shaped clamps 80 at their lower ends provided with a thumb screw 82. These clamps are adapted to rest upon the bumper and be clamped thereto by the thumb screws 82 to rigidly anchor the lower end of the ladder to the bumpers for both steadying the structure and for securely fastening the ladder to give access to the sleeping quarters.

Adjacent their lower ends, the angulated portions 76 are provided with a plurality of apertures 84 which are longitudinally spaced, and suitable bolts 86 carried by the clamping section 78 may be selectively placed in these apertures to slidably adjust the clamping means upon the lower end of the ladder and rigidly secure the same thereto.

It should be particularly observed, by reference to Figures 4 and 5, that the upper portion and the angulated portion of the ladder 18 are so proportioned that in the closed position of the platform sections, the upper portion of the ladder is adapted to lie upon and closely engage the bottom wall 22 of the rear section which constitutes the top of the device in its closed position, while the angulated portion 76 together with its extension 78 lies and rests upon the closure panel 34 of the open ends of the sections.

Since, from the foregoing, the construction and advantages of this vagabond traveler are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. A collapsible automobile sleeping assembly comprising a foldable platform, said platform having front and rear sections hingedly connected, means for mounting said front section upon the top of an automobile, a ladder connected to said rear section of said platform, means for clamping said ladder to the bumper of an automobile to support the rear section of said platform, said rear section overlying said top, a crankshaft journaled on one section, crank arms fixed to said crankshaft, connecting links pivotally connected to said crank arms and to the other section, a handle for rocking said crankshaft.

2. A collapsible automobile sleeping assembly comprising a foldable platform, said platform having front and rear sections hingedly connected, means for mounting said front section upon the top of an automobile, a ladder connected to said rear section of said platform, means for clamping said ladder to the bumper of an automobile to support the rear section of said platform, said rear section overlying said top, said ladder being pivoted to the rear section at the opposite end from the hinged connection of the rear section, said ladder having an angulated end portion whereby when the rear section is folded upon the front section, the latter will lie closely upon the rear section with the angulated end portion closely lying upon the open ends of the two sections.

3. The combination of claim 2 wherein the ladder has a longitudinally extensible lower portion.

4. A foldable platform for a collapsible automobile sleeping assembly comprising front and rear sections hingedly connected, said front section being mounted upon and said rear section overlying to a top of an automobile on which said platform is mounted, a crankshaft journaled on one section, crank arms fixed to said crankshaft, connecting links pivotally connected to said crank arms and to the other section, a handle for rocking said crankshaft.

5. A foldable platform for a collapsible automobile sleeping assembly comprising front and rear sections hingedly connected, said front section being mounted upon and said rear section overlying a top of an automobile on which said platform is mounted, said sections having each a pair of side walls and an end wall with an end of each section being open, said sections being hinged at their open ends, a closure for the open ends of both sections when said sections are folded upon each other, said closure being pivoted to one section at its open end and normally underlying the other section.

References Cited in the file of this patent

UNITED STATES PATENTS

| | | |
|---|---|---|
| 1,364,292 | Mackey | Jan. 4, 1921 |
| 1,424,222 | Tuttle | Aug. 1, 1922 |
| 1,797,229 | Giffel | Mar. 24, 1931 |
| 2,068,960 | Northrup et al. | Jan. 26, 1937 |
| 2,222,636 | Strauss | Nov. 26, 1940 |
| 2,440,821 | Godwin | May 4, 1948 |
| 2,521,815 | Will | Sept. 12, 1950 |
| 2,530,450 | Cast | Nov. 21, 1950 |
| 2,546,588 | Ellis | Mar. 27, 1951 |
| 2,561,168 | Beckley | July 17, 1951 |
| 2,600,799 | Otvas | June 17, 1952 |
| 2,640,204 | Cutler | June 2, 1953 |
| 2,642,587 | Taylor | June 23, 1953 |